(12) United States Patent
Sample

(10) Patent No.: US 9,192,182 B2
(45) Date of Patent: *Nov. 24, 2015

(54) SYSTEM AND METHOD FOR CONTINUOUS CITRUS PEEL CELLULAR EXPANSION

(71) Applicant: ALARMA PATENTS, LLC, Allen, TX (US)

(72) Inventor: Edward W. Sample, Allen, TX (US)

(73) Assignee: Alarma Patents LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,310

(22) Filed: Feb. 12, 2013

(65) Prior Publication Data

US 2013/0156916 A1 Jun. 20, 2013

Related U.S. Application Data

(63) Continuation of application No. 13/210,253, filed on Aug. 15, 2011, now Pat. No. 8,383,186, and a continuation of application No. 12/175,717, filed on Jul. 18, 2008, now Pat. No. 8,017,171.

(60) Provisional application No. 60/950,529, filed on Jul. 18, 2007.

(51) Int. Cl.
| | |
|---|---|
| *A23K 1/20* | (2006.01) |
| *A23L 1/212* | (2006.01) |
| *A23N 12/04* | (2006.01) |
| *A23L 1/222* | (2006.01) |
| *A23L 1/015* | (2006.01) |
| *A23N 12/06* | (2006.01) |
| *A23B 7/06* | (2006.01) |
| *A23L 3/16* | (2006.01) |
| *A23B 7/005* | (2006.01) |
| *A23K 1/00* | (2006.01) |
| *A23K 1/14* | (2006.01) |
| *A23K 1/18* | (2006.01) |

(52) U.S. Cl.
CPC ............. *A23L 1/2126* (2013.01); *A23B 7/0053* (2013.01); *A23B 7/06* (2013.01); *A23K 1/002* (2013.01); *A23K 1/146* (2013.01); *A23K 1/1813* (2013.01); *A23L 1/0151* (2013.01); *A23L 1/2225* (2013.01); *A23L 3/165* (2013.01); *A23N 12/04* (2013.01); *A23N 12/06* (2013.01)

(58) Field of Classification Search
CPC ..... A23N 12/04; A23N 12/06; A23B 7/0053; A23B 7/06; A23L 1/0151; A23L 1/2126; A23L 3/16–3/245; A23L 1/222–1/2225; A23K 1/146; A23K 1/1813
USPC .......... 426/616, 640, 489, 510, 511, 518, 520
See application file for complete search history.

(56) References Cited

U.S. PATENT DOCUMENTS

| | | | |
|---|---|---|---|
| 2,455,382 A * | 12/1948 | Nelson | ............................. 536/2 |
| 2,483,761 A | 10/1949 | Dux | |
| 2,536,240 A | 1/1951 | Vincent | |

(Continued)

*Primary Examiner* — Drew Becker
(74) *Attorney, Agent, or Firm* — Shannon Bates; Griffith Bates Champion & Harper LLP

(57) ABSTRACT

A method for treating citrus peel by clean steaming pieces of raw citrus peel; and rupturing at least some of the cells of the pieces of raw citrus peel to release liquid, sugar and oil bound within the pieces of raw citrus peel. The clean steaming step may involve using clean steam that is free of chemical water treatment additives, and the clean steam may be the only water introduced to the process.

20 Claims, 3 Drawing Sheets

(56) References Cited

U.S. PATENT DOCUMENTS

| | | | |
|---|---|---|---|
| 2,548,895 A * | 4/1951 | Graham et al. ............... 536/2 |
| 2,556,579 A | 6/1951 | Forkner |
| 2,654,734 A * | 10/1953 | Skinner ............... 536/2 |
| 2,708,627 A * | 5/1955 | Toulmin, Jr. ............... 426/429 |
| 2,724,648 A | 11/1955 | Burdick |
| 2,971,606 A * | 2/1961 | Vischer, Jr. ............... 96/409 |
| 2,976,159 A | 3/1961 | Swisher |
| 3,083,104 A | 3/1963 | Celmer |
| 3,529,644 A | 9/1970 | Douglas |
| 3,551,163 A | 12/1970 | Vincent |
| 3,745,020 A | 7/1973 | Lime |
| 3,868,466 A | 2/1975 | Swisher |
| 4,497,838 A | 2/1985 | Bonnell |
| 4,864,970 A * | 9/1989 | Bardoff ............... 122/32 |
| 4,952,504 A * | 8/1990 | Pavilon ............... 435/163 |
| 6,027,757 A * | 2/2000 | Menon ............... 426/443 |
| 6,151,799 A | 11/2000 | Jones |
| 7,060,313 B2 * | 6/2006 | Jones ............... 426/489 |
| 7,485,332 B2 | 2/2009 | Chu et al. |
| 7,879,379 B1 * | 2/2011 | Widmer et al. ............... 426/481 |
| 8,017,171 B2 * | 9/2011 | Sample ............... 426/616 |
| 8,383,186 B2 * | 2/2013 | Sample ............... 426/616 |
| 2002/0031581 A1 * | 3/2002 | Baker, IV ............... 426/431 |
| 2006/0105089 A1 | 5/2006 | Chu et al. |
| 2006/0177916 A1 | 8/2006 | Stewart et al. |
| 2008/0213849 A1 * | 9/2008 | Stewart et al. ............... 435/164 |
| 2010/0166913 A1 * | 7/2010 | Stewart ............... 426/54 |
| 2013/0109065 A1 * | 5/2013 | Godfroid et al. ............... 435/135 |

* cited by examiner

SYSTEM AND METHOD FOR CONTINUOUS CITRUS PEEL CELLULAR EXPANSION

CROSS-REFERENCE TO RELATED APPLICATIONS

This application is a continuation of U.S. patent application Ser. No. 13/210,253 filed Aug. 15, 2011, now U.S. Pat. No. 8,383,186 B2 issued on Feb. 26, 2013, and entitled "System and Method for Continuous Citrus Peel Cellular Expansion," which is a continuation of U.S. patent application Ser. No. 12/175,717 filed Jul. 18, 2008, now U.S. Pat. No. 8,017,171 B2 issued on Sep. 13, 2011, and entitled "System and Method for Continuous Citrus Peel Cellular Expansion," which claims priority to and the benefit under 35 U.S.C. §119(e) of U.S. Provisional Patent Application No. 60/950,529 filed Jul. 18, 2007 and entitled "Continuous Steam Injected Citrus Peel Cellular Expansion Process and Multiple Value-Added Food Grade Solid and Liquid Products Produced Thereby," all of which are incorporated herein by reference for all purposes.

DETAILED DESCRIPTION

Figure 1:
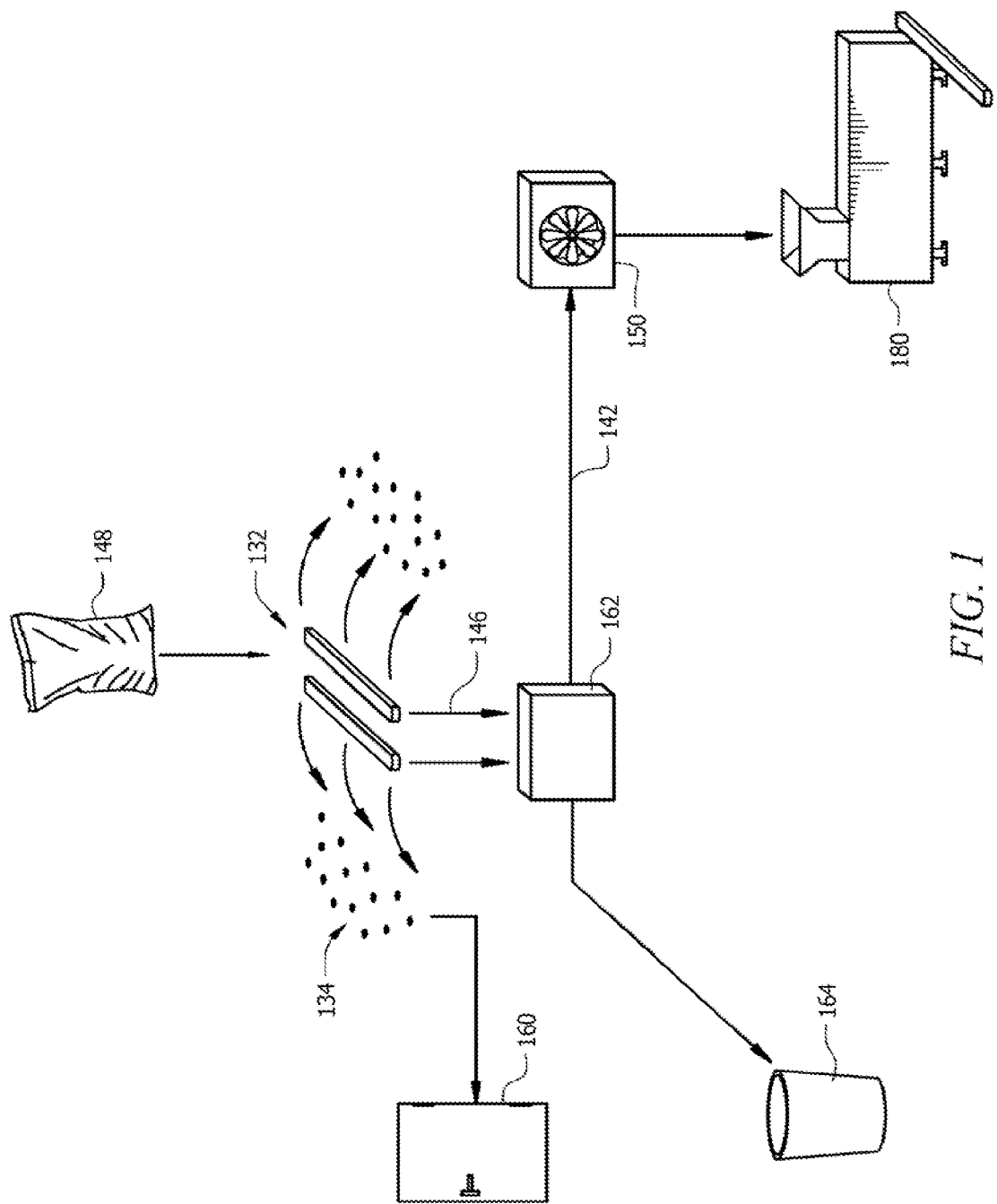
FIG. 1 shows a portion of a process of an embodiment of the present invention.

An embodiment of the present invention provides an improved system, method and apparatus for injecting steam into citrus peel. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Current citrus peel waste processing is based upon processing technology that is at least 70 years old. It is largely unprofitable, grossly ineffective, and adds non-combusted fuel oil to the peel mass when fuel oil is used as a direct fire heat source. The process is also a high user of energy and very problematic to operate.

The traditional method employed to process citrus peel waste harbors a wide array of harmful side effects. As one example, since toxic chemical dewatering agents are used in current citrus peel processing operations, use of the end product of dried peel is limited to one product—a toxic cattle feed supplement.

In addition, current processed citrus peel cannot be used as a singular non-supplemental individual feed source for cattle. Doing so would be very harmful to the cattle due to the feed's high toxicity resulting from direct fuel oil firing, if used, as well as from the chemical dewatering agent(s). Moreover, no human consumable product can be manufactured from current processed/dried citrus peel mass.

In addition the chemical dewatering agent widely used today is Calcium Oxide (CaO), which reacts with other naturally occurring compounds in the peel to create many processes encumbering carbonate, sulfite, and nitrate compounds. In addition, the carbonate family of compounds form hard stone-like scale deposits during processing over the contact surfaces. This "stone like scale" drastically reduces heat transfer in the already highly inefficient 1930 sugar beet based technology (e.g. rotary dryers, which are typically direct fired when using fuel oil). As with other fuel oil burners, total combustion is never achieved, thus the citrus peel absorbs the toxic non-combusted or partially combusted fuel oil, which adds to the already toxic side affects of today's standard process dried citrus peel.

Piping internals, waste heat evaporator heat exchanger tube surfaces, rotary dryer internals, etc. become "plated" with a stone-like surface that is mostly Calcium Carbonate known as limestone. High pressure "laser water guns" can marginally slow the build up, but are generally ineffective in removing the ever-increasing scale build up. The very high temperature combustion temperatures created from the dryer fuel oil burner, like that of natural gas burners that are widely used can exceed 1,500 degrees Fahrenheit, and acts like a "slake kiln dryer" to tenaciously harden the carbonates onto all dryer contact surfaces. Over years of use, the rotary dryer constantly loses what little efficiency that it had when constructed down to levels below 25%.

The current antiquated, high energy citrus peel process and drying methodology is used by the citrus juice extraction industry as a standard methodology that processes the peel into a rationed cattle feed product—which is the only current form of the dry mass end product. Some processors pelletize the end dried product called "flake" to decrease transportation costs by increasing the material's density. Governmental regulations mandate any citrus processor that processes over 2,000,000 boxes per year must process the waste peel into a dried flake form. There are a few exceptions to this mandate: some facilities own and operate their own citrus groves or cattle grazing land of adequate size on which they deposit raw peel as a way around the mandate. This practice is being reviewed by the EPA and other governmental agencies in efforts to disallow this loophole.

However, profitable opportunities are lost by use of the current antiquated citrus peel processing method. Additionally, although biomass can be extracted from peel waste, it is not possible due to the current non-food grade processing methodology and the lack of equipment with stainless steel construction and/or stainless steel contact surfaces necessary to facilitate food processing criteria.

There are only two popular other citrus peel process designs, yet neither is employed in any commercial use due to their individual economic, operational, and environmental limitations. One such design integrates an explosive solvent (alcohol) and poses imminent mortal danger to plant personnel as well as destructive potential building damage when and if it becomes operational. This particular design is quite similar to the procedures employed in crude soya oil processing (commonly referred to as crude vegetable oil) extraction facilities, which uses hexane as the solvent of choice. However, many vapor explosions have occurred within the soya processing industry, which produced heavy facility damage as well as loss of life. This design is known as a rotocell batch design. Solvent extraction systems require an exorbitant amount of solvent in an attempt to extricate bound sugar/oil from their respective materials by flooding or washing a prepared soybean flake with solvent. Considering the explosive atmosphere created by the use of the very volatile solvent for citrus peel processing, the extensive and costly use of explosion proof electric motors, non-spark generating tools/equipment, an extensive array of gaseous vapor recovery equipment, the required use of vapor condensers, air/liquid and solid material pollution abatement equipment associated with this design, it is easy to understand why this process is generally considered to be undesirable and very unprofitable to install and operate commercially.

The other batch process method, which is an improvement over the flammable solvent method, uses large volumes of heated water as its solvent. For every pound of raw peel processed, nearly 3 pounds of heated water is required to supersaturate processed peel and peel cake masses. In addition, high capacity evaporative equipment is required to process the water/oil/sugar emulsion into their respective individual components; evaporative water, d-limonene, and peel sugar concentrate (known commonly as molasses). However, capital costs are high for the evaporation equipment and the required energy costs to process the water is excessive in today's energy conscious climate. With these limiting and costly characteristics, the process is generally deemed uneconomical to install and operate. To this day, no batch water solvent system has been installed as a pilot plant or commercial operation.

Moreover, water batch designs produce an emulsion usually not greater than 4.5 degree brix and require extensive evaporative equipment to do so. A batch type peel processing system needs large volumes of heated water and storage vessels in which to immerse the peel and create hot water slurry of 140 degrees Fahrenheit. The excessive amount of water is needed to create a lower viscosity mixture in the attempt to make the slurry easier to mix and pump. This is time consuming and costly in an effort to replace the sugars/oils bound within the peel mass with water. In addition, the time required and the great amount of water needed to accomplish this task is high and at times can exceed 45 minutes/batch cycle.

In contrast, the continuous steam injection process of an embodiment of the present invention operates continuously without forming a process batch. A batch system requires many large volume tanks, high horsepower tank agitators, and high capacity/high horsepower pumps to constantly keep the peel slurry in motion to minimize liquid/solid separation, whereas a system of the present invention does not require large volume batch tanks with high horsepower agitators as are necessary with a batch system.

Moreover, the capital and operating costs of the water batch solvent design are extremely high. Further, batch methods create a very diluted emulsion, when run through a standard vertical or horizontal screw press, of usually no more than 4.5 degree brix and require high tonnage (evaporative water capacity) evaporative equipment to concentrate the low brix sugar emulsion and attempt to strip d-limonene (peel oil) from the emulsion.

Consequently, no alcohol solvent or super-water batch saturation citrus peel process (i.e. batch tank design) are commercially employed today due to the many inherent process limitations, impracticalities, and economic/environmental limitations associated with these types of approaches. These processes are also energy excessive in their operating requirements and the alcohol solvent peel oil/sugar extraction process is explosive. To address and eliminate these restrictive issues and increase the extraction of additional mass from the citrus peel, requiring minimal processing equipment and personnel, a highly efficient continuous steam injection process using no explosive solvents or batch processing methodology, is employed by an embodiment of the present invention.

The process and methodology described herein illustrates how additional amounts of citrus peel value added by-products meeting food-grade quality standards can be produced. For example, such food-grade products produced include: citrus peel oil, fermentable sugars, and a processed citrus peel dry mass that exceeds pectin pomace quality. These products are made by utilizing a continuous steam injection process to properly treat prepared citrus peel and actually expand and/or rupture the cellular structure within the peel mass with an extremely low volume of water addition.

Strategically and continuously injecting clean live steam into the conveyed citrus peel slurry mass (either raw cut peel or pressed peel cake) utilizes the rapid release of heat into the condensing mass when steam condenses and thus the liquid in the peel changes into a vapor or gas. This abrupt change of state in the bound water within the peel structure triggers the expansion and/or rupture of the citrus peel cell when the water within the peel escapes as gaseous vapors. Rupturing or expanding the peel cells allows the release of bound water, sugars, and oils found in the outer surface of the peel (flavedo). While the flavedo is denser than the inner surface (albedo), which also has bound water, the water in the albedo is not as tenaciously bound. Rupturing the cell sac facilitates release of the bound water and peel oil within each of the two parts of the peel (flavedo and albedo.)

Figure 2:
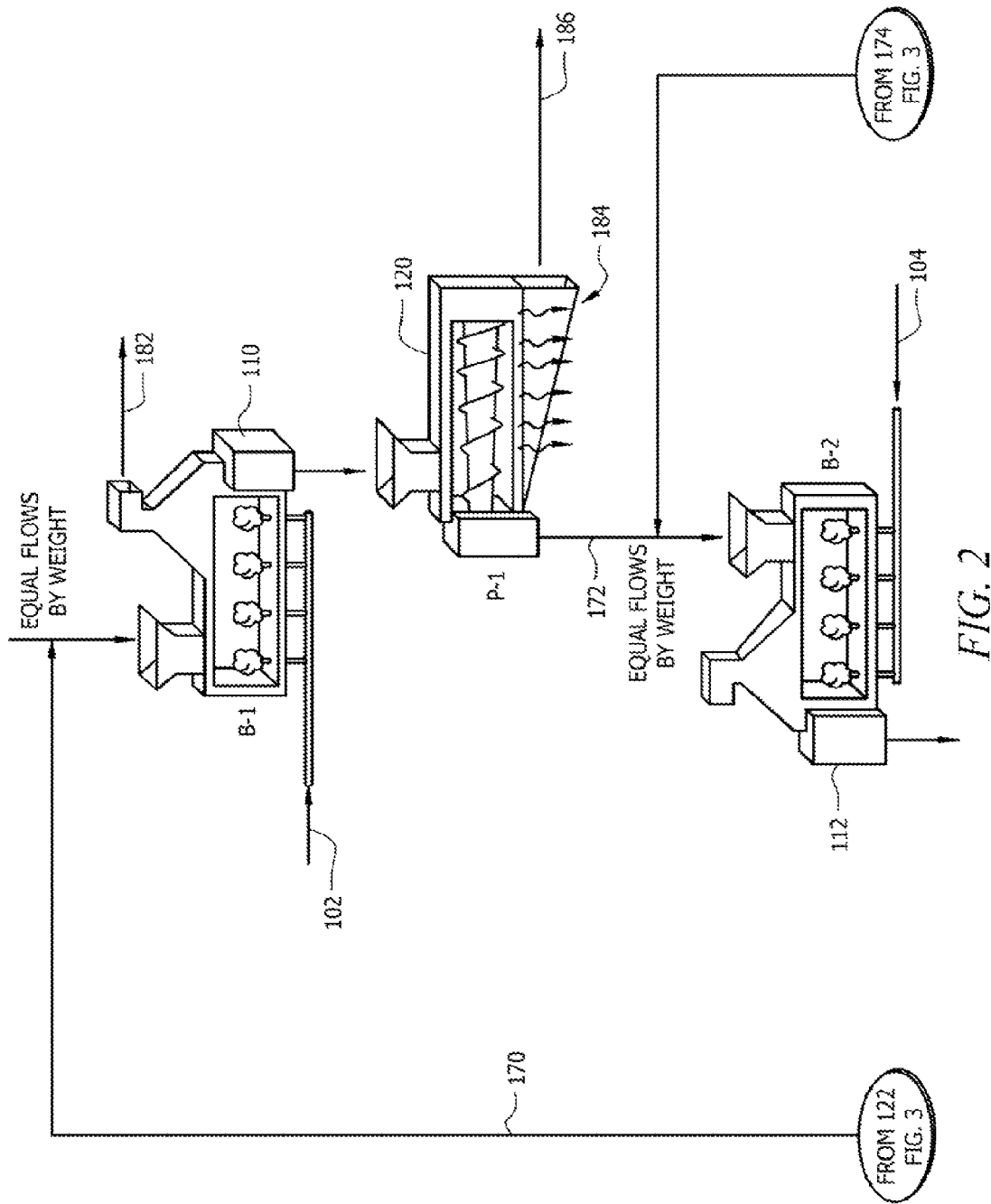
FIG. 2 shows another portion of a process of an embodiment of the present invention.
Figure 3:
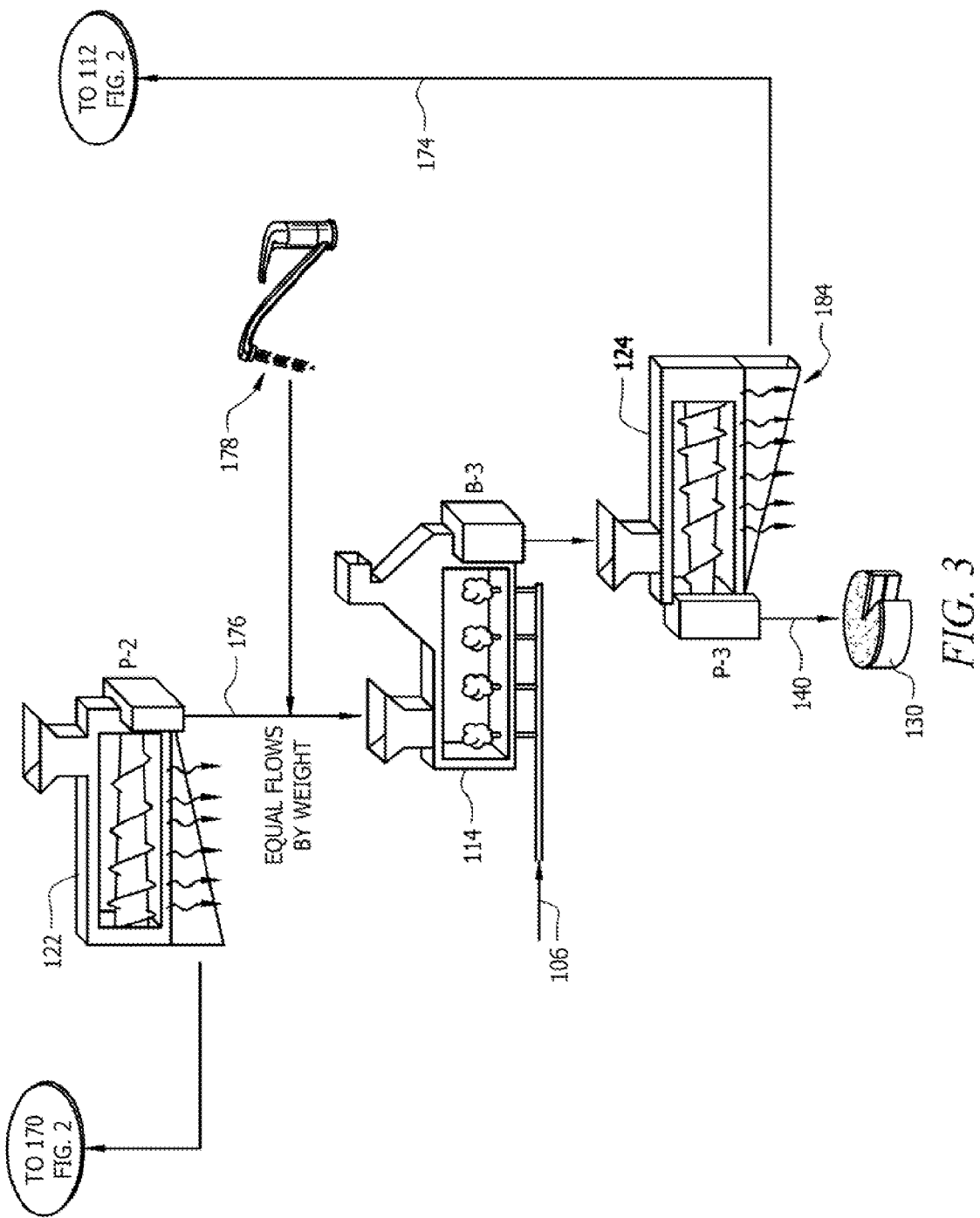
FIG. 3 shows a third portion of a process of an embodiment of the present invention.

Now referring generally to FIGS. 1-3, an embodiment of the present invention includes three separate progressive continuous steam injection/mixing and pressing stages 102, 104, 106. Counter washing of the pressed cake or raw cut peel, is used to maximize oil/sugar removal from the peel. These progressive and continuous processing stages 102, 104, 106, positioned in series, employ the use of mechanical pressing equipment, where liquid/solid separation is readily accomplished. Using this process configuration and three blanch 110, 112, 114 and press stages 120, 122, 124 positioned in-series provides continuous processing resulting in a high quality food-grade citrus peel mass in a pectin pomace cake product. When the third and final stage produces a pectin pomace cake 130 that is properly dried, a very high quality, food grade, pectin pomace citrus peel mass is created. This processed citrus peel material 130, being non-pollutive in its creation, can be used in a myriad of products for both human and non-human consumption.

An embodiment of the present invention continuously employs steam to directly and indirectly rapidly elevate much of the peel mass/peel cake material temperature to above 212 degrees Fahrenheit (at sea level), allows entrained oils/sugars/integral water to be rapidly released from the peel and employs simple mechanical means such as vertical/horizontal screw presses and belt presses.

However, in this embodiment, the steam used to process the peel is free of the chemical water treatment additives that are sometimes found in the production of steam. The excluded compounds include: anti-scaling additives, such as inorganic powdered sulphite; oxygen scavengers such as Sulphite Tannin DEHA Carbohydrazide, and the like. If these compounds, or chemicals similar in chemical structure and use, come into contact with an end product intended for human consumption, the otherwise edible material can be rendered non-consumable.

There are at least two ways in which steam can be used in direct contact with a food use product and not reduce its edible quality. One method is the employment of steam created by a clean steam generator. This type of apparatus is basically a vessel using immersed heating elements to boil standard tap water under pressure and thus create a steam source. This method is mainly used where the pounds/hour of steam required is low (e.g. 10 to 300 pounds/hour) and is usually employed in hospital environments or food packaging applications. This type of clean steam generation requires substantial electricity usage in the creation of clean steam and is not economically practical when flow rates exceed 300 pounds/hour.

The second clean steam generating method comprises the use of a steam filtration system, which is a bank of filtering canisters mounted in parallel and manufactured in such a way as to capture and retain the many foreign compounds resulting from the use of boiler water treatment system technology, thereby turning process steam into clean and usable steam for food contact use. In addition, the filtration canisters, supplied with replaceable cartridges, remove any condensate from the steam flow. The steam filtration system of the present invention not only converts process steam into clean steam—it concurrently converts the steam (5 to 35 psig) from a saturated steam flow into a dry steam flow. This results in a reduction of the amount of condensate and maximizes heat transfer into the raw peel and subsequent peel cake, or pressate slurry mixtures, with minimal resultant condensate.

The resultant food grade emulsion from each of the three subsequent series of steam injection 102, 104, 106 and indirect heating conveyed (commonly referred to as blanching 110, 112, 114) and screw press steps 120, 122, 124 is processed in such a fashion as to raise the brix level for the evaporator emulsion from the first stage press group to an unprecedented level of 5 to 10 degree brix. The three progressive steam injection conveying vessels 110, 112, 114 and immediate screw press operation 120, 122, 124, produces a final stage citrus peel cake containing minimal residual oil and a low sugar residual and uses no solvents and only thermal and mechanical forces. The moisture content of the press cake is lower than that achieved by the toxic chemical dewatering chemistry, even if it is combined with screw press technology.

The peel products made by this clean steam method are food-grade quality and include: citrus peel sugar, citrus peel oil, citrus peel water, and high quality citrus peel pectin pomace. The steam injection system in conjunction with the heated pressate and sanitary system process design is unlike any prior citrus peel process design in operation today. In addition, the limited amount of steam needed to expand the citrus peel and rapidly raise the peel temperature leaves little condensate to be removed later in the process.

Unlike prior art citrus peel processing designs that use massive amounts of water in their processing procedures, only steam and a minimal amount of water (in this case condensate) is introduced according to an embodiment of the present invention. In addition, the condensate releases its thermal energy (enthalpy) into the peel mass and pressate mixtures and thereby raises the temperature very quickly. The ratio of pounds of raw peel to pounds of steam (condensate) is approximately 10 pounds of peel mass to less than 1 pound of condensate. By comparison, the only other water based peel process design has a ratio of 10 pounds of peel mass to more than 25 pounds of water. Thus, the water solvent system uses approximately 25 times more water than the continuous steam injected process design of the presented invention.

Embodiments of the present invention allow pressate emulsion to exceed 5.0 degree brix versus a water batch design that produces an emulsion less than 4.5 degree brix. However, products with more than 4.5 degree brix sugar/water/oil emulsion are ideal for fermentation into ethanol, once the oil has been removed by standard centrifugation techniques. In addition, the emulsion is hot (greater than 140 degrees Fahrenheit), which is an ideal temperature to begin fermentation into ethanol and/or evaporation (concentration) steps. Indeed, approximately, 20,000 gallons of ethanol can be made from 1,000,000 gallons of 8 to 10 degree brix peel sugar/water emulsion.

Moreover, an embodiment of the present invention yields a considerable amount of salable processed pectin pomace. In contrast, current citrus process systems that generate ethanol do not produce pectin pomace, plus a considerable amount of product is lost in the form of sludge discharged by centrifugation of pressate prior to evaporation in a waste heat evaporator. A waste heat evaporator is a highly inefficient evaporative apparatus unlike that of a standard 5-effect TASTE (Thermally Accelerated Short Term Evaporation) evaporator as used in the process of the present invention.

Additionally, evaporative equipment needs are far less than one third in this embodiment as compared to that of the water super-saturation batch type design. Moreover, no toxic chemical dewatering additives are used in the practice of the present invention. Further, an innovative array of new products can result from the highly efficient citrus peel process design of the present invention that are adapted for both human and non-human consumption.

Some examples of human consumable products will be described. One food product produced by the present invention is de-oiled/de-sugared/dried citrus peel that is milled into citrus peel fiber flour. This fiber flour can range from greater than 50 mesh (US Tyler Standard) to less 200 mesh (US Tyler Standard). This very beneficial and healthful citrus peel fiber flour can be added to a myriad of baked goods, bread products, pastries, cookies, cakes, juices, juice blends, salad dressings, sauces, mixes, seasonings, meat rubs, etc., to reduce the net carbohydrate value, and to increase fiber content and anti-oxidant value. The ORAC (Oxygen Radical Absorption Capacity) of the processed citrus peel mass generated by the present invention is 115. This is a very high value in healthy anti-oxidants, and is also known to be an effective natural shelf life extender or preservative that can easily replace such chemical preservatives such as: BHT, BHA, benzoates, sodium nitrate, sulphites, sorbates, propionic acid, sorbic acid, benzoic acid, etc. These preservatives can be replaced with a small percentage of citrus peel fiber flour when incorporated into manufactured and natural food products, including baked goods, juices, sauces, mixes of all kinds, salad dressings, etc. Thus, a healthier food/juice/mix/sauce/etc. food product is created that stays fresher longer without all of the unwanted and unhealthy preservatives and high carbohydrate value associated with a product that does not contain citrus peel fiber flour. Also, the continuous steam injected peel cellular expanded material has been successfully tested and can be used as the major percentage component in many important human consumable non-meat (vegan) products such as: vege-burgers, vege-hotdogs, vege-sausages, vege-lunch meat, vege-Salisbury steak, vege-chicken salad, vege-shrimp salad, etc. This continuous steam injected peel product can become a healthy and nutritious ingredient in many foods to lessen the amount of unhealthy components that are so prominent in many of today's high fat and carbohydrate laden food products.

A few examples of non-human consumables will now be described. Two very important non-human products made via the steam injected citrus peel process of the present invention are: Pet food filler and nutrition booster and a very healthy natural binding agent in wet type pet foods that is high in fiber (82.7%) and anti-oxidants (ORAC 115). The high pectin/ fiber/antioxidant quality characteristics easily replace ingredient cohesion agents such as wheat gluten, wheat gluten protein and vegetable fat that are currently used and may be unhealthy. In addition, allergic reactions to wheat gluten is quite prominent in humans. Moreover, most wheat gluten is imported and in recent times has been found to be unsafe and/or dangerously tainted. Currently, there is no viable safe and healthful alternative in the market place for these types of products other than citrus peel fiber flour. Citrus peel "pectin pomace" fiber flour, made via the highly efficient and food grade continuous steam injected process of the present invention works as a tremendously healthy food filler/binding agent high in natural antioxidants and crude fiber.

The significance of the continuous steam injection process is the ability to manufacture edible products high in antioxidants. Rather than just making an incremental improvement over the currently operative waste peel process, the process of the present invention is a quantum leap ahead of the current peel processing system. Indeed, all other processing technologies have so many inherent design/operational flaws that they are not feasible to build. With the introduction of the technology of the present invention, the value of processed/dried citrus peel is vastly increased and commercially desirable.

The continuous steam injection citrus peel cellular expansion process will be described. To execute this new steam induced process, several significant changes are made to current citrus peel processing methodology. The first change is to add a step to mechanically separate 132 the inherent seed population from the rag and peel. This greatly reduces the potential bitter taste from all end products (dried peel mass, oil, sugar, and water fractions) and creates a secondary marketable process stream of saleable seeds 134. Once graded and removed of fugitive peel fiber pieces/rag/etc., the fugitive seeds 134 are removed from the raw peel prior to cellular expansion. The separated seeds 134, which can either be pressed to extract citrus seed oil or frozen whole and/or dried, have market demand and values of their own. Current waste peel processing and drying systems do not contain a seed-separation step 132 in the manufacture of processed citrus peel. As a result, end products are inherently additionally tainted by the seeds. This increases the limitations for many potential uses of products from current technologies for both human and non-human use.

Additionally, current conventional processed and dried citrus flake is sometimes pelletized in order to increase the density of the crudely processed/dried peel from approximately 15 pounds/cubic foot to approximately 40-50 pounds/cubic foot. As a common practice, the molasses (crude sugar) collected from the waste heat evaporators, which are driven by the exhaust heat from the grossly inefficient rotary dryers, is sprayed onto the peel flake and/or pellets in the attempt to sweeten the toxic, bitter dried peel mass to entice the cattle to eat the material. This is a tremendous waste of fermentable sugar that could be used in the fermentation process to produce ethanol.

Furthermore, the pelletized dried citrus material is produced mainly for the ocean going ship export business to maximize freight tonnage and fuel efficiency. The freighters are approximately 30,000 to 40,000 tons and travel mostly to the England. To date, the value of citrus peel pellets (CPP) has rarely exceeded $0.06/pound ($120.00/ton) and shipping costs are approximately $12.00/ton ($480,000.00/40,000 ton freighter). The current value of CPP is approximately $0.04/lb to $0.08/lb ($80.00-$160.00/ton). Please note that the CPP is the same material as currently processed/dried citrus peel flake, but it is run through a pellet mill to increase its density with the added molasses that is sprayed on and then cooled to add more weight to the pelletized mass. Moreover, citrus peel flake is barely economically sold locally due to the high cost of ground transportation and the low economic value associated with both CPP/citrus peel flake.

In addition, storage problems are abundant when CPP is stored in conventional vertical silos. CPP will inherently expand (swell in size) over time with the presence of high humidity conditions (more than 65% RH) and form bridge blockages within vertical silos. This prevents/inhibits the vertical silo from being emptied from standard bottom unloading machines without major effort and cost. Installation of expensive high-pressure compressed air blasters is a common method to cope with this anomaly, but is not a guarantee of success. Only horizontal storage facilities (large free span metal buildings fitted with sub floor screw conveyors) can accommodate CPP and/or citrus peel flake removal operations without too much trouble. Front end loaders are then used to vector the pellets/peel flake into the sub-floor screw conveyors for storage removal and conveyance.

Calcium oxide (CaO) is the most commonly used citrus peel chemical dewatering agent (Quick Lime). As explained above, CPP and dried citrus peel flake made with the addition of Quick Lime can be used ONLY as a rationed cattle feed supplement due to the generation of the toxic compound Calcium Hydroxide (Ca(OH)2). Calcium Hydroxide, commonly referred to as household lye, is very harmful to humans when ingested and thus makes all foods tainted with this compound labeled as not for human use. Conventional CPP is made using wet hammer mill disintegration technology where wet end particulate pieces range from four square inches to tenths of a square inch. These extreme random results from crude and rudimentary particulate generating equipment makes it near impossible to make a pellet that has any viable chance of keeping the geometric shape once leaving the pellet mill die. However, this method has been in use for over 50 years without any improvements made since its conception. In addition, the extensive oil and sugar that remain in conventional processed citrus peel inherently ferments and immediately expands upon being made.

In contrast, the continuous steam injected citrus peel process of the present invention does not employ harmful chemical dewatering agents or processing chemicals. In addition, it generates many valued products that are very versatile and all edible food grade such as: dried citrus peel biomass, food grade citrus peel, CitruSmart™ food grade sweetener, debittered citrus peel sugar solids, food grade peel oils (e.g. cold press oil and d-limonene), and natural "citrus water" which is produced from the evaporation process by a TASTE evaporator (or similar evaporator).

Further, the steam injected citrus peel cellular expansion process adds many supplemental value added by-products that are all food grade quality due to the unique and totally innovative process design and the use of all stainless steel material contact components, etc.

One of the highly useful and valuable by-products is food grade citrus peel molasses (sugar), when evaporated via a designated TASTE evaporator or equivalent apparatus. This 100% safe-to-ingest citrus peel sugar has tremendous value in the manufacture of alcohol for the consumable spirit industry (e.g. distilleries). This sugar can also be a source for ethanol production as a motor fuel additive, as previously mentioned (e.g. gasoline/alcohol blend for "E85" gasoline). Also, during TASTE evaporation, a valuable/higher quality d-limonene is produced vs. that from a traditional waste heat evaporator currently used in today's citrus peel processes.

Excessive, high temperature combustion heat (either by direct fire Natural Gas, Propane, and/or Fuel Oil sources) is the norm in today's processed citrus peel rotary dryers and blackens/burns the material being dried. Moreover, moisture control is nearly impossible so over-drying is the common practice to insure that minimal wet product is discharged from the dryer. Thus, blackened/charred product (out of specification) usually exits the dryer. In addition, these dryers take up to 90 minutes to dry from a 77%-80% moisture content to a 15% moisture content. Further, the dryers are crudely built with non-stainless steel (non-food grade) contact materials, and have an extremely high BTUs/pound of water removal ratio (usually over 3,300 BTUs/lb. water removed). In contrast, the dryers 140 of the present invention are fitted with food grade internals such as: a fluidized bed or a traveling bed (known as static bed) and/or rotary drying methods and require, in most cases, less than 1,400 BTUs/lb. of water removed. On the other hand, existing peel process rotary peel cake dryers are clearly one of the most inefficient, non-human product drying machines.

Contrastingly, embodiments of the present invention produce high quality citrus peel oil/sugar/water are created, as well as a pectin pomace, and citrus peel fiber flour of unequaled purity. The steam induced citrus peel expansion process stands alone in its ability to create such high brix food grade emulsions (8-10 degree brix) while requiring the least amount of energy in doing so. Additionally, the process creates no adverse waste discharge materials of any kind, while creating many value added by products of extensive human and non-human (i.e. mostly pet food) uses.

Moreover, if chemically dewatered citrus peel pellets (CPP) and/or dried citrus peel flake are improperly fed to milking cows, the milk cow's ability to generate milk can experience serious disruptions. This disruption in lactating ability is called scours.

The processed and dried peel mass produced by the present invention, however, is 100% ingestible providing valuable health benefits to all consumers and animals. Therefore, a multitude of non-human uses for the de-oiled/de-sugared dried citrus peel, high in anti-oxidants, result in the wet and dry pet food industries.

Back to the deseeding of the peel, this step 132 assists in immediately limiting the amount of tramp/fugitive citrus seeds that ride along within the peel. This is most apparent with peel ejected from juice extractors built by the FMC Corporation (FMC) or similar devices. The end function and mission of the deseeding equipment 132 is to produce a processable peel mass 142 that is thoroughly seedless in its composition. Minimizing seed tainted raw peel material yields a peel mass with the least inherent bitterness when processed and dried via the processes and techniques described below.

Citrus peel deseeding 132 is best accomplished by a few methods. One option is to slowly rotate a perforated rolled plate or reinforced woven wire cloth cylinders in excess of 3 feet diameter vs. 6-10 feet in length. This type of de-stoner is fitted with internal product lifting/separation paddles that allow the peel to slowly tumble as peel mass moves toward the discharge end. Repetitive opportunities are provided for seeds to become dislodged from the peel mass and escape through the perforations in the cylindrical wall. A companion smaller diameter grid clearing brush system mounted on the outside of the rotating screen and extending tangent to the exterior cylinder wall continuously clears the screen of material lodged in the grid. De-stoning equipment of such diameter in the internal cylinder design allows spherical and elliptical items like stones and/or citrus seeds to fall through the perforations and to be carried off to other processing functions away from the main peel flow. The rotating de-stoner/de-seeder cylinder is sloped from inlet to discharge of such a degree as to induce desired material conveyance while allowing adequate dwell time within the rotating cylinder to accomplish the desired deseeded results 146. Additional opportunities are provided for seeds to become dislodged from the peel mass and escape through the perforations in the cylindrical wall rotating gleaning machine.

Another option is to incorporate multi-deck shaker conveyors, fitted with a self-cleaning random ball system. This allows mature as well as immature seeds to fall through to the lower deck and to be safely discharged and collected, while the continuous screen clearing system provides a continuous grid clearing area to allow continuous deseeding of the conveyed peel 148.

Because the deseeding step 132 removes unwanted seeds 134 that add the most bitterness to any processed peel, the need for very expensive debittering equipment is minimized.

Once the raw incoming peel 148 has been properly deseeded 132, the peel 142 is carried via one or more conveyors to the peel disintegrator 150. The peel disintegrator 150 is an apparatus that cuts the peel mass into a specific and uniform particulate size. This method allows capture of additional processable peel mass that would be lost if the current and widely accepted hammer milling process is employed. Peel that goes through a hammer mill is macerated into a slimy, wide size variable particulate mass. In doing so, a tremendous amount of once potentially processable peel mass is lost. This loss in pectin peel mass ends up being mixed into the "emulsion" side of the current peel processing system. This high load of pectin in the emulsion would disrupt any continuous evaporator (i.e. TASTE evaporator).

The macerated pectin peel mass material ends up being removed as a pectin paste sludge by a high speed centrifugation step performed on the emulsion prior to evaporation. Hence, the common hammer milling step is an antiquated, extremely deleterious peel disintegrating processing step that is employed in a futile attempt to produce a marginal valued peel reduced particulate.

Conversely, the high speed cutting mechanism 150 used in the steam injected process of the present invention minimizes peel loss and maximizes the production of the many subsequent value added products. This is achieved by creating a non-macerated particle that produces an unprecedented amount of cross-sectional surface area from the peel of consistent uniform size, while minimizing damaging impact and desecration of the original peel mass.

Moreover, continuously injecting steam into the de-seeded peel mass can be accomplished by modifying existing peel reaction screw vessels (if constructed of all Stainless Steel contact components), by installing direct steam input nozzles and/or valve assemblies. These converted reaction screws result in blanching equipment 110, 112, 114 that indirectly heat by the installation of either all or one the following heat additive means: hollow screw flighting and/or low pressure steam heated jacketing on the screw trough and/or tub with steam injection nozzles. Current waste citrus peel processors use these stainless steel peel reactors to mix and convey either powdered CaO or liquid CaO solution into the peel mass. The reaction of free and bound water with the chemical dewatering agent creates the toxic compound Ca(OH)2 (as described earlier). During this process, reaction heat is generated quickly and turns the peel into a slimy, reddish purple mass. The slime coats the peel and adversely affects press performance. The chemical dewatering agent actually does more harm than good in the attempt to dewater the peel. As stated earlier, hammer mills create a peel particulate distribution of such great size variation. This wide range of particulates drastically reduces press performance, dryer efficiency, and palletizing ability.

The peel reactor mixing action is used to maximize contact between CaO and peel surface area as possible in the shortest time prior to its entry into a screw press. However, this process is really adverse to the reality as the slime generation is quickened and thus makes pressing equally more difficult and less efficient. These peel reactors are commonly large stainless steel U-trough screw conveyor designs of 18 inches in diameter to 36 inches in diameter, which vary in length and are fitted with either paddles, cut or cut and folded, flight configurations, to mix and convey the peel mass/CaO mixture to the pressing operations. Some reaction screw conveyor/ mixers can be as long as 80 feet. These existing reaction screws can be replaced with a continual mixing/conveyor apparatus that have both direct and indirect steam heat emitting production capabilities, like that of standard blanching apparatus equipped with both indirect/direct steam heating apparatus (steam jacketed trough and/or hollow flight mixing-conveyor augers). However, instead of replacing existing reaction screws, they can also be modified by all or some of the following modifications described below.

A common waste peel reaction vessel can be fitted with steam injection nozzles that are equipped with steam flow control mechanisms and outside trough insulation to maximize heat transfer into the peel mass and minimize condensation within the reaction screw. These modifications, added to any typical citrus peel reaction screw, can be improved by replacing standard mixing/conveying flighting with a steam fired hollow flight conveyor and/or adding indirect steam heat transfer coils mounted on the outside of the existing screw trough. These modifications further improve the heating capability of the reactor vessel to impose indirect heat upon the peel, pressate mixture or peel cake, which in turn improves the ability to extract oil, sugar, and water from the peel pressed mass.

During the direct steam injection process and using a clean steam source, some volatile peel oil (d-limonene) within the peel can be released as a vapor and mixes with the steam vapor. The internal peel water physically changes from captive cellular water to released water vapor and very volatile peel oil, which ruptures the peel cellular structure. During the phase change, where bound cellular water and oil are converted into cellular water vapor and gaseous oil vapor, the cell sac or vesicle basically ruptures. The water vapor/oil vapor mixture is removed from the covered modified peel reaction vessels via ducting and natural laws of convection. The water and oil vapors are then condensed via water cooled heat exchangers. The resultant solution can be sent to a centrifuge to accomplish "cold press" quality peel oil extraction and water separation or via peel oil decanting in a holding tank. Oil rises to the surface and is then skimmed off and collected. The oil skimming device may comprise an endless loop mechanism that is widely used in the waste water treatment industry for oil and grease removal prior to wastewater treatment.

The amount of extracted residual peel oil that exists within waste citrus peel can vary greatly. This is dependent upon what type of initial peel oil removal equipment the fruit is subjected to prior to juice extraction and by fruit type.

Instead of raw peel being sent to a conventional hammer mill or similar device that macerates the peel into randomly sized particles at a considerable cost in terms of lost pectin mass, the juice extracted peel is sent to a deseeding operation 132 to remove a large volume of seeds from the juice extract peel first. The seeds can be removed via various array of de-stoning/gleaning apparatuses, as previously described, that removes both the mature and immature seeds. The recovered seeds 134 are further processed into other by-products such as citrus seed oil, citrus seed meal, dried/frozen seeds, and the like 160. The apparatus 132 for removing seeds can also be designed as linear vibratory multi-deck shaker conveyors or perforated cylinders, woven wire cloth screen cylinders large enough to allow mature and immature seeds to exit the peel flow, or woven wire cloth of appropriate wire diameter and grid design allowing mature seeds to pass through the grid and conveyed on to other seed collection and processing systems. The deseeded peel 146 continues onward to the next step of unique peel oil extraction/reduction process, described below.

Peel disintegration will now be described. The de-seeded peel 146 is conveyed and metered after peel stream passes through a high volume metal detection device 162. This device 162 quickly diverts the peel stream to a waste conveyor for an allotted time to adequately divert any tramp metal 164 harboring within the peel mass. The deseeded peel stream 142, adequately assured to be free of tramp metal, flows into the high speed peel cutting apparatus 150, previously described, that precisely and continuously produces a non-macerated peel particle mass that is uniform in size. This step can be accomplished with equipment supplied by Urschel Laboratories equipment, Hobart Equipment, and similar machines 150 fitted with similar cutting internals and design. This initial peel size reduction machine uniquely allows the peel mass to be processed for maximum oil/peel/water separation, made possible by the exponential increase in exposed peel cross sectional area. This great change in the physical peel characteristics allows an immense amount of the peel cellular structure to be exposed for live steam contact. The live clean steam, which is at a temperature in excess of 250 degrees Fahrenheit, forces bound oil and water to be rapidly released, along with inherent sugar solids.

When the peel mass is cut into small, precise size segments and introduced into a live clean steam environment, pectin and peel mass loss is minimized. This yields a far superior peel mass, which is expanded during the extremely quick rise in the peel, peel cake and slurry (internal temperature from ambient to over 150 degrees Fahrenheit in a matter of seconds).

The processing of the peel by the modified peel reaction screw or blanchers will now be described. Now that the peel has been properly deseeded and precisely cut/reduced to a homogeneous particle size exhibiting a tremendous amount of area per unit volume, the peel enters either a modified peel reaction screw vessel or a standard blancher 110. This type of apparatus adds a specific quantity of clean steam, from a designated pressure line, to continuously and quickly raise the cut peel mass and/or slurry temperature (from ambient to over 150 degrees Fahrenheit) with a minimal net water (condensate) addition to the peel mass and/or slurry.

This process accomplishes at least two items. One is in addition to the introduction of continuous clean steam into the continuous peel mass flow, the steaming zone area is also fitted with "indirect" steam heating area surfaces (i.e. steam jacketed trough and/or steam flooded hollow flight mixing auger) that allow on line peel process moisture and/product temperature adjustments to be made to the peel mass, as required. This is done to maintain the desired product temperature and simultaneously produce minimal net condensate introduction into peel/peel cake mass. Incorporating such process controls in a real time fashion allows for superior efficiency in adjusting steam/heat inputs to effectively expand the citrus peel sacs, plus extraction of oil/water/sugar solids, as incoming product variations are common with any type of citrus peel mass flow.

Another important item is the quickly controlled peel mass and/or slurry rise in temperature. Specifically, the rise in temperature utilizes a controlled minimal amount of steam condensate within a specific dwell time. This allows for maximum oil and sugar release within individual citrus peel oil sacs and membranes. Moreover, this is accelerated during the subsequent screw press 120 liquids/mass separation step immediately after the blanching operation 110. The cellular expansion that has taken place within each precisely cut peel oil vesicle allows the peel mass to readily give up the liquid contents inherent within the processed peel mass and or peel cake. Additionally, the controlled live steam flow 102 introduction to the peel mass and indirect steam heating to the processing reactor troughs, achieved either by steam heated hollow flight conveyor and/or steam heated coils attached to the outside of the reactor zone, allows additional product temperature control to the peel mass slurry. Specifically, in this embodiment, the temperature of the processed peel, emulsion, cut peel emulsion or slurry is controlled to not less than 150 degrees Fahrenheit throughout each of the three (3) continuous blanching 110, 112, 114 and pressing operations 120, 122, 124.

The initially deseeded and now raw/cut peel mass is thoroughly heated, cellular expanded, agitated/mixed with emulsion from the second stage press pressate, and conveyed or mixed in the first 110 of 3 blanchers 110, 112, 114. Once the peel emulsion slurry is continuously mixed and heated for approximately 10 to 20 minutes, the slurry is pumped and flow controlled to the first stage press operation 120. However, any number of or type of mechanical presses; i.e. vertical, horizontal (single or double screw), or belt type press(es) can be used to accomplished the pressate/peel cake separation.

In this embodiment, before the press operation happens, pressate 170 from the second stage press(es) 122 is pumped into the first blancher 110, once it is heated to over 150 degrees Fahrenheit and combines with the incoming deseeded/metal free, raw, cut peel. Incoming deseeded/raw/cut peel entering the first stage blancher 110 is about 5 to 0.8:1 ratio of pressate:peel mass and is maintained at the first blancher/mixing step while live clean steam 102 is injected into the peel/peel cake mass slurry at various flow rates to accomplish a quick rise in slurry temperature. Screw press head cone pressure and proper selection of screw press screen perforations creates this match in mass of down stream pressate and incoming upstream raw peel and/or peel press cake.

The pressate 170 from the second stage press(es), produced after the second blanching operation, is at a brix level of 2 to 3 degree brix. This second stage pressate 170 sugar/oil/water solution is mixed with the raw incoming deseeded/freshly cut peel in the first stage blancher 110, only after the pressate 170 is passed through a heat exchanger (where its temperature is raised to about 150 degrees Fahrenheit). This ultimately creates a first stage pressate solution to an unprecedented high brix sugar/oil/water emulsion of greater than 5 to 10 degree brix. This first stage pressate solution is then centrifuged for particulate clarification/removal and then can be sent to at two different processes. One process is an ethanol fermentation process, since its physical temperature and brix level of the emulsion are ideal for fermentation processing for ethanol manufacturing.

Another method is to pump first stage pressate solution to a TASTE evaporator or similar type apparatus for the creation of the following food grade products: high grade citrus peel d-limonene; or high grade citrus peel molasses (sugar concentrate) or cloud as it sometimes referred, at 30 to 70 degree brix. This type of high grade citrus peel molasses can be used as a beverage drink base and/or used in the alcoholic beverage distillation industry, or the fuel ethanol industry, or can be easily stored in refrigerated large volume storage tanks for use at a later date.

The evaporative water from the evaporator is a type of citrus water that can be used for boiler feed water make-up, fruit washing, plant wash down operations or saleable citrus water. This type of citrus water can be used in the cosmetics industry, shampoos, etc. but most importantly is used as the final rinse mixing water for second stage press cake and mixed together at the third (final) stage blancher 124 operation.

Press citrus peel cake 172 exiting the first stage press(es) then enters (either pumped or cascaded) into the second stage blancher and mixes with the pressate, after going through a heat exchanger to raise the pressate temperature to >140 degrees Fahrenheit from the third stage press 124 and live clean steam 104 is added to elevate and maintain the peel cake temperature above 140 degrees Fahrenheit during mixing/conveying. In this embodiment, the second stage blancher 112 is similar to the first stage blancher 110, yet the required size is smaller due to the incremental decrease in mass (liquid and solid/material) density and volumes as oils/sugars are being progressive/incrementally/continuously removed through each subsequent continuous blanching/pressing step.

Mixing time for the equal parts of first stage press cake and third stage pressate 174 in the second stage blancher 112 ranges from 9-40 minutes depending upon the type/variety of peel being processed (i.e. orange: temples, valencias, hamlins, navels, etc. or grapefruit: pink or red, or lemons). Once the mixture of each subsequent part from the first stage peel press cake and third stage pressate 174, which is 1.5 to 0.05 degree brix, exits the second stage blancher 112 the live steam heated/cellular expanded mixture cascades/enters the second stage press. The resultant pressate, being at an advantageous temperature in excess of 140 degrees Fahrenheit and ranges between 1.5 to 3.5 degree brix, leaves the second stage press 122 and mixes with the resultant incoming deseeded/raw/cut peel in first stage blancher 110, thus entering the first stage blanching process.

Press cake 176 from the second stage press cascades/enters directly into the third stage blancher 114 in a ratio of approximately 1 pound press cake (from second stage) to 0.25 to 1.0 pound condensate (from the TASTE Evaporator) and is mixed with clean evaporative water 178 from the TASTE evaporator in a ratio of approximately 1 pound of cake to 1 pound of water and with clean live steam 106. If no evaporative apparatus is used to process the first stage pressate emulsion, potable water can be substituted for the absence of an evaporative water supply in the above ratio to the second stage press cake 176 that enters the third stage blancher 114 and subsequent third stage press 124. The third stage blancher 114 is somewhat smaller than the second stage blancher 112, since the overall peel cake mass has been reduced. Hence, lesser volume/size equipment is required with each progressive combination Blanching/Press step as are the number of presses of like HP/speed.

In sum, referring again to FIGS. 1-3, the raw peel 148 is deseeded by deseeders 132. The seeds 134 are then sent to a press, dryer or freezer 160 while the deseeded peel 146 is sent to a metal detector 162. The metal detector 162 sends the tramp metal, chute and waste peel off to get disposed while deseeded and tramp metal free peel is sent to a high speed cutter 150. Once cut, the peel is sent to a bulker/feeder 180.

The peel is then sent to a first blancher 110 where clean steam 102 is injected. In addition, the blancher 110 includes a vapor hood and ducting (oil and water vapor) 182. The peel mixture is then sent to a first screw press 120. Pressate collection 184 is then sent to an evaporator 186 or tanker for ethanol processing (8 to 10 degree brix) emulation while the press cake 172 is sent to the second blancher 112 where clean steam 104 is injected. The peel is then sent to second screw press 122. The pressate collection 170 is then sent back to mix with the peel in the first blancher 110 while the press cake 176 is sent to the third blancher 114 where clean steam 106 is injected. The peel is then sent to the third screw press 124. The pressate collection 174 is sent back to the second blancher 112 while the press cake 150 is sent to a dryer.

Upon completion of the third stage blanching step 114, the heated mixture cascades, is pumped, or is conveyed into the third stage press 124. The third stage pressate 140, being at 0.05 to 1.0 degree brix, is collected and heated to not less than 150 degrees Fahrenheit. It is then mixed with the first stage press cake, where they both enter the second stage blancher 112. The clean steam direct and indirect process steam heated blanching apparatus thoroughly mixes the now very viscous mixture to insure maximum opportunity for final cellular expansion. This final heated mixture is pressed by the third stage press 124, where the discharged cake 140, being at a moisture of approximately 74% to 82% WWB, is now ready to be dried via any one of the previous food grade drying technologies aforementioned (e.g. fluidized bed, rotary cylindrical, static traveling bed). Any of these drying methods dries the third stage peel cake 130 into a food grade citrus peel mass that can be physically altered into a myriad of food and non food use products.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A citrus peel treating process comprising the steps of:
   providing a quantity of raw citrus peel;
   removing substantially all of the seeds from the quantity of raw citrus peel;
   removing substantially all tramp metal from the quantity of raw citrus peel;
   cutting the quantity of raw citrus peel into pieces thereof;
   providing a blancher;
   directing the pieces of raw citrus peel into and through the blancher; and
   steaming the pieces of raw citrus peel in the blancher with clean steam that is free of chemical water treatment additives;
   wherein the clean steam is the only water introduced to the process; and
   wherein steaming the pieces of raw citrus peel in the blancher releases liquid, sugar and oil bound within the pieces of raw citrus peel.

2. The process of claim 1, further comprising:
   providing a press;
   directing the pieces of raw citrus peel from the blancher into and through the press; and
   mechanically pressing the pieces of raw citrus peel in the press, thereby transforming the pieces of raw citrus peel into press cake and pressate;
   wherein the process operates continuously without forming a process batch.

3. The process of claim 1 wherein steaming the pieces of raw citrus peel in the blancher comprises direct steam injection and indirect steam heating.

4. The process of claim 3 wherein direct steam injection comprises adding a specific quantity of clean steam from a designated pressure line to the pieces of raw citrus peel.

5. The process of claim 3 wherein indirect steam heating comprises adjusting the moisture content and temperature of the pieces of raw citrus peel.

6. The process of claim 1 wherein steaming the pieces of raw citrus peel in the blancher further comprises:
   adding heat to the pieces of raw citrus peel; and
   rupturing at least some of the cells of the pieces of raw citrus peel to release the liquid, sugar and oil bound within the pieces of raw citrus peel.

7. The process of claim 6 further comprising raising the temperature of the pieces of raw citrus peel to at least 150 degrees Fahrenheit.

8. A citrus peel treating process comprising the steps of:
   steaming pieces of raw citrus peel with clean steam that is free of chemical water treatment additives; and
   releasing liquid, sugar and oil bound within the pieces of raw citrus peel;
   wherein the clean steam is the only water introduced to the process.

9. The process of claim 8, further comprising:
   mechanically pressing the pieces of raw citrus peel, thereby transforming the pieces of raw citrus peel into press cake and pressate;
   wherein the process operates continuously without forming a process batch.

10. The process of claim 8 wherein steaming the pieces of raw citrus peel comprises direct steam injection and indirect steam heating.

11. The process of claim 10 wherein direct steam injection comprises adding a specific quantity of clean steam to the pieces of raw citrus peel.

12. The process of claim 10 wherein indirect steam heating comprises adjusting the moisture content and temperature of the pieces of raw citrus peel.

13. The process of claim 8 wherein steaming the pieces of raw citrus peel further comprises:
    adding heat to the pieces of raw citrus peel; and
    rupturing at least some of the cells of the pieces of raw citrus peel to release the liquid, sugar and oil bound within the pieces of raw citrus peel.

14. The process of claim 13 further comprising raising the temperature of the pieces of raw citrus peel to at least 150 degrees Fahrenheit.

15. A continuous, steam-injection citrus peel treating process comprising the steps of:
    clean steaming pieces of raw citrus peel; and
    rupturing at least some of the cells of the pieces of raw citrus peel to release liquid, sugar and oil bound within the pieces of raw citrus peel;
    wherein the clean steaming comprises using steam that is free of chemical water treatment additives; and
    wherein the clean steam is the only water introduced to the process.

16. The process of claim 15 wherein steaming the pieces of raw citrus peel comprises direct steam injection and indirect steam heating.

17. The process of claim 15, further comprising:
mechanically pressing the pieces of raw citrus peel.

18. The process of claim 17, further comprising:
processing the pieces of raw citrus peel through a plurality of progressive, continuous clean steaming and mechanical pressing stages;
wherein the process operates continuously without forming a process batch.

19. The process of claim 18, further comprising:
transforming the pieces of raw citrus peel into press cake and pressate.

20. The method of claim 19 wherein the process creates one or more of the following food grade peel products: citrus peel sugar, citrus peel oil, citrus peel water, citrus peel pectin pomace, and citrus peel fiber flour.

* * * * *